United States Patent [19]

Frazer

[11] Patent Number: 4,744,386
[45] Date of Patent: May 17, 1988

[54] MODULAR HYDRAULIC ACTUATOR

[75] Inventor: Neil F. Frazer, Stroud, United Kingdom

[73] Assignee: Cameron Iron Works USA, Inc., Houston, Tex.

[21] Appl. No.: 84,651

[22] Filed: Aug. 11, 1987

[51] Int. Cl.[4] .................. F16K 43/00; F16K 31/122; F16K 37/00
[52] U.S. Cl. ............................ 137/315; 92/5 R; 92/128; 92/130 C; 92/130 D; 137/556; 251/63.6
[58] Field of Search ............... 137/315, 556; 92/128, 92/130 R, 130 A, 130 B, 130 C, 130 D, 5 R; 251/63.5, 63.6

[56] References Cited

U.S. PATENT DOCUMENTS

| | | | |
|---|---|---|---|
| 3,248,879 | 5/1966 | Natho | 60/36 |
| 3,290,003 | 12/1966 | Kessler | 251/318 |
| 3,379,405 | 4/1968 | Natho | 251/63.6 |
| 3,913,883 | 10/1975 | Irwin | 251/63.6 |
| 3,958,592 | 5/1976 | Wells et al. | 251/63.6 |
| 3,993,284 | 11/1976 | Lukens, Jr. | 251/63.6 |
| 4,135,547 | 1/1979 | Akkerman | 137/315 |
| 4,230,299 | 10/1980 | Pierce, Jr. | 251/63.6 |
| 4,316,482 | 2/1982 | Pearce et al. | 251/63.6 |
| 4,372,333 | 2/1983 | Goans | 251/63.6 |
| 4,423,748 | 1/1984 | Ellett | 251/63.6 |
| 4,436,279 | 3/1984 | Bonds et al. | 251/63.6 |
| 4,442,757 | 4/1984 | Goans | 92/82 |
| 4,445,424 | 5/1984 | Foster et al. | 92/5 R |
| 4,491,060 | 1/1985 | Boski | 92/128 |
| 4,519,575 | 5/1985 | Akkerman et al. | 251/58 |
| 4,523,516 | 6/1985 | Foster et al. | 92/130 B |
| 4,585,025 | 4/1986 | Hendrick | 137/315 |
| 4,585,207 | 4/1986 | Shelton | 251/63.6 |
| 4,651,970 | 3/1987 | Sadler | 251/63.6 |
| 4,671,312 | 6/1987 | Bruton | 251/63.6 |

OTHER PUBLICATIONS

FMC Petroleum Equipment Group Brochure, "Taking the Lead", Spring, 1986, pp. 6-7.
Rockwell Manufacturing Company Brochure, 1966, p. 63, entitled "Rockwell-McEvoy Underwater Valves".

*Primary Examiner*—George L. Walton
*Attorney, Agent, or Firm*—William E. Shull

[57] ABSTRACT

A surface safety valve hydraulic actuator of modular construction. The actuator includes separately installable, removable, and interchangeable wirecutting and non-wirecutting spring modules, used with the same hydraulic cylinder and bonnet. The bonnet is attached to the body of the valve. A lower stem extends through a lower seal and into the valve body cavity, and is connected to the gate segments of the valve. A hydraulic cylinder is removably attached to the bonnet. An upper stem with a central bore is disposed in the cylinder chamber and carries a piston thereon, and extends through an upper seal in the top of the hydraulic cylinder. A spring module is removably attached to the hydraulic cylinder, and includes a spring can telescoped over the top of the cylinder. The spring can is rotatably connected to an annular spring retainer, which in turn is mounted on the cylinder. A coupling rod is inserted through the upper stem and screwed into the top of the lower stem. A spring coupler is connected to the upper end of the coupling rod, and bears upon the upper surface of a spring plate. In the non-wirecutting spring module, a single coil spring is disposed in the spring can between the spring plate and the spring retainer. In the wirecutting spring module, dual coil springs are used.

23 Claims, 8 Drawing Sheets

MODULAR HYDRAULIC ACTUATOR

BACKGROUND OF THE INVENTION

The present invention is generally related to equipment and systems for the production of oil and gas, and more particularly to a surface safety valve hydraulic actuator for offshore use and having separately removable, installable and interchangeable wirecutting and non-wirecutting spring modules for use with the same hydraulic cylinder and bonnet.

In order to reduce the risks inherent in locating, accessing, and producing oil and gas, the equipment and systems used in the endeavor are typically provided with safety devices for preventing, interrupting, or stopping the flow of oil or gas in the event of an emergency. Such devices include surface safety valves, which are intended to be closed rapidly to shut off the flow of oil or gas when an emergency occurs, or when it is otherwise desired to close the valve quickly. Such safety valves are typically provided with hydraulic actuators designed to keep the valves open through application of pressurized hydraulic fluid to a piston in the actuator, and to close the valve through application of spring force when the pressurized hydraulic fluid is lost through hydraulic control system failure or is otherwise no longer applied to the piston. Such an actuator may be termed fail-safe-closed, since in the event of an emergency causing loss of hydraulic control fluid pressure, the actuator will automatically cause the valve to assume the "safe" or closed state.

From time to time, such surface safety valves must be operated during periods when wirelines, such as logging cables or the like, are employed for running various tools and equipment through the valves into the well. During such periods, for example during workover operations or when the well is performing poorly, the surface safety valve hydraulic actuator must be able to close the valve completely and rapidly upon shutoff or loss of hydraulic control fluid pressure and, in addition, it must be able to shear any wireline up to, for example, 7/32" braided line, which happens to be extending through the valve at the time. The actuator must have this wirecutting capability because there may not be enough time during an emergency and prior to closing of the safety valve to remove the wireline and its associated tools from the well.

During normal production operations, the hydraulic actuators for the surface safety valves do not require this wirecutting capability. Since the periods during which wirecutting capability is required are typically more infrequent and of shorter duration than the periods of normal production operations, more often than not the additional wirecutting capability of the hydraulic actuators is superfluous. In the past, however, if wirecutting capability was ever to be needed at a particular location, the operator had the choice of either installing a wirecutting actuator permanently, or of temporarily installing a complete wirecutting actuator assembly in place of a non-wirecutting actuator assembly only when the wirecutting capability was needed. The first of these two alternatives is uneconomical, since a wirecutting actuator is of necessity larger and more expensive than a non-wirecutting actuator, and the operator is paying more for the wirecutting capability when most of the time he does not require it. The second of these two alternatives is also uneconomical, since it typically involves inordinately time-consuming actuator assembly removal and installation procedures, equipment handling difficulties due to the weight of the actuator assemblies and the limited space on offshore facilities in which to work, and excess inventory of actuator assemblies.

SUMMARY OF THE INVENTION

The present invention provides a surface safety valve hydraulic actuator which is of modular construction. The actuator of the present invention includes separately installable, removable, and interchangeable wirecutting and non-wirecutting spring modules, used with the same hydraulic cylinder and bonnet. If wirecutting capability is required at a particular location where a non-wirecutting actuator is present, the hydraulic cylinder and bonnet can be left in place, the non-wirecutting spring module removed, and a wirecutting spring module installed in its place. When the wirecutting capability is no longer required, for example when workover operations are complete, the wirecutting spring module is removed and replaced with the less expensive non-wirecutting spring module. Thus, the wirecutting spring module can be used as a "tool" and installed only when it is necessary to have its wirecutting capability in reserve; otherwise, the non-wirecutting spring module will do. Since only the spring module need be interchanged when shifting back and forth between wirecutting and non-wirecutting modes, the inventory requirement for actuator parts is reduced, and typically only one wirecutting module is required per given valve size. Moreover, since the hydraulic cylinder and bonnet are unchanged, the spare parts inventory requirement is also reduced.

The spring modules of the present invention can be quickly and easily removed, reinstalled, replaced, or interchanged without disturbing the drift setting or the pressure integrity of the valve. In addition, the hydraulic cylinder common to both the wirecutting and non-wirecutting embodiments of the present invention can be removed from the bonnet, either with or without prior removal of the spring module, and reinstalled or replaced, again without disturbing the drift setting or pressure integrity of the valve.

The actuators of the present invention are relatively low in height and weight, and are easily handled in the often-tight spots during installation and removal. The spring modules are safety sealed to contain the compression springs for ease and security of handling for personnel.

The actuators of the present invention include a spring module, a hydraulic cylinder, and a bonnet. The bonnet has a lower flange for attachment through suitable studs and nuts to the body of the surface safety valve. A lower stem extends downwardly through a lower stem seal in the bonnet and into the valve body cavity. A lifting nut on the lower end of the lower stem is connected to the gate segments of the valve, and raises or lowers them along with the lower stem to close or open the valve to fluid flow, respectively.

A hydraulic cylinder is removably attached to the bonnet at adjoining flanges, again by suitable studs and nuts. An upper stem with a central bore therethrough is disposed with its lower end in the cylinder chamber and carrying a piston thereon, and its upper end extending out through an upper stem seal in the top of the hydraulic cylinder.

A spring module is removably attached to the hydraulic cylinder, and includes a spring can telescoped over the top of the cylinder. The spring can is rotatably connected at its bottom to an annular spring retainer, which in turn is mounted on the cylinder by screw threads, an L-slot and pin, or other suitable means. An end plate partially closes in the upper end of the spring can.

A threaded coupling rod is inserted through the hollow upper stem and screwed into the top of the lower stem. A spring coupler is connected to the upper end of the coupling rod, and has a lower body portion received in the central aperture of a spring plate and an upper flange portion bearing upon the upper surface of the spring plate. In the non-wirecutting spring module, a single coil spring is disposed in the spring can between the spring plate and the spring retainer. In the wirecutting spring module, dual coil springs are used.

A hydraulic control fluid supply and return port and associated passages in the hydraulic cylinder provide access to the piston for pressurized fluid. When pressurized fluid is applied to the piston, the upper stem is moved downwardly, along with the lower stem and connected gate segments, the coupling rod, spring coupler, and spring plate, thereby opening the valve and compressing the spring or springs. When the pressurized fluid is removed from the piston, the spring or springs push upwardly on the spring plate, which moves the spring coupler, coupling rod, lower stem, and upper stem upwardly as well, thereby lifting the gate segments and closing the valve.

BRIEF DESCRIPTION OF THE DRAWINGS

For a detailed description of the preferred embodiment of the present invention, reference will now be made to the accompanying drawings, wherein.

DETAILED DESCRIPTION OF THE PREFERRED EMBODIMENT

Figure 1:
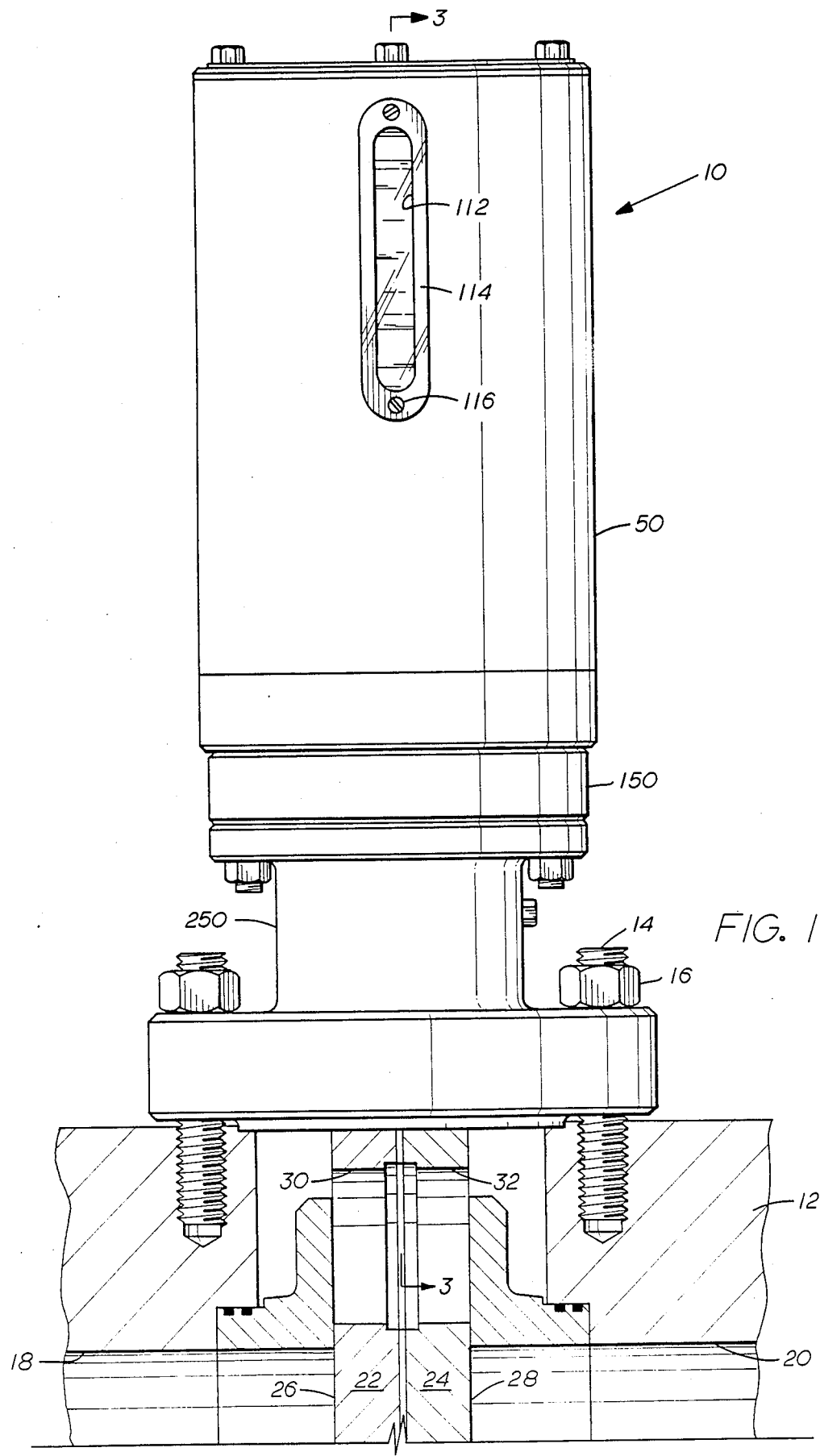
FIG. 1 is a framentary view partly in section and partly in elevation of a non-wirecutting surface safety valve hydraulic actuator of the present invention, installed on the body of the valve.
Figure 2:
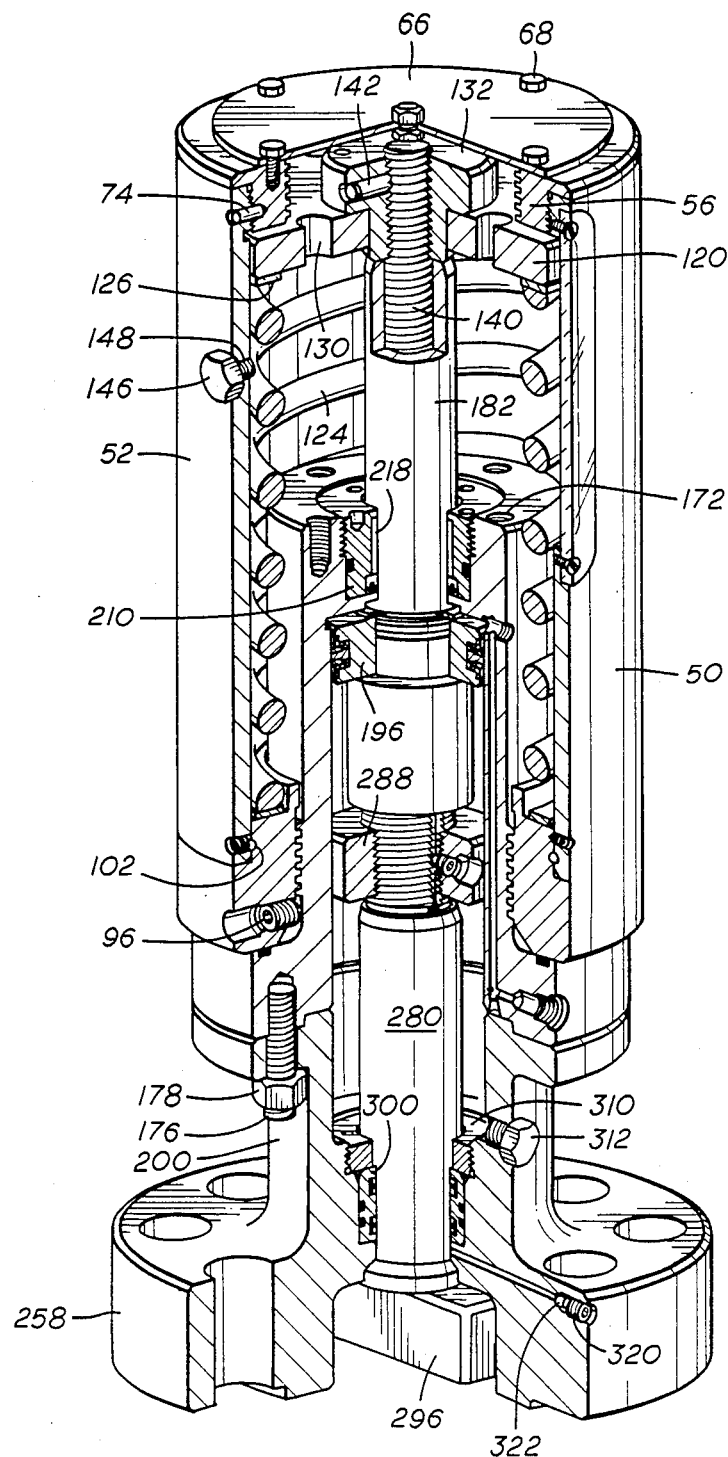
FIG. 2 is an isometric, cut-away view of the actuator of FIG. 1, with the gate-actuating parts in their upper positions, corresponding to the valve's being closed.
Figure 3:
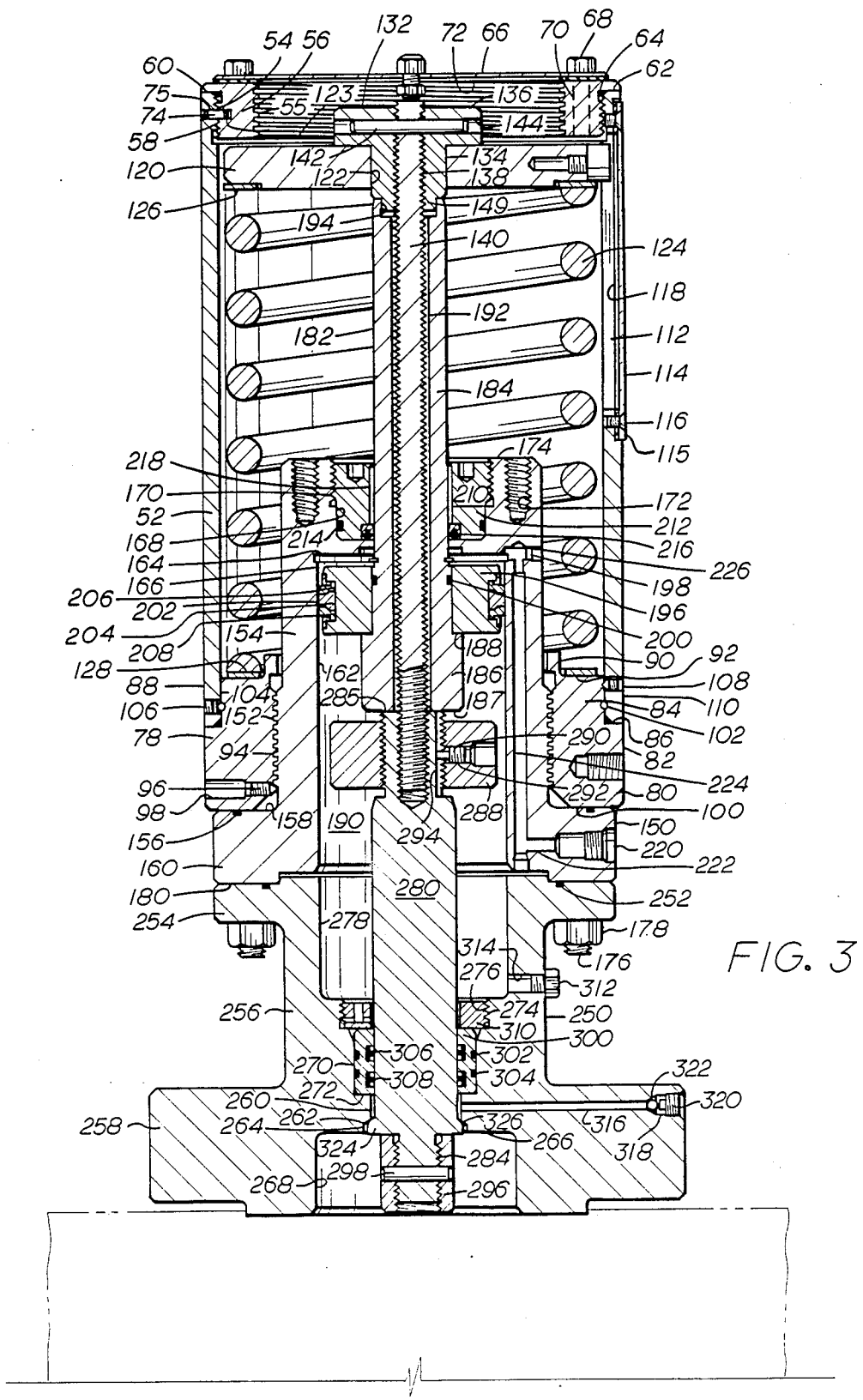
FIG. 3 is a vertical cross-sectional view of the actuator shown in FIGS. 1 and 2.
Figure 4:
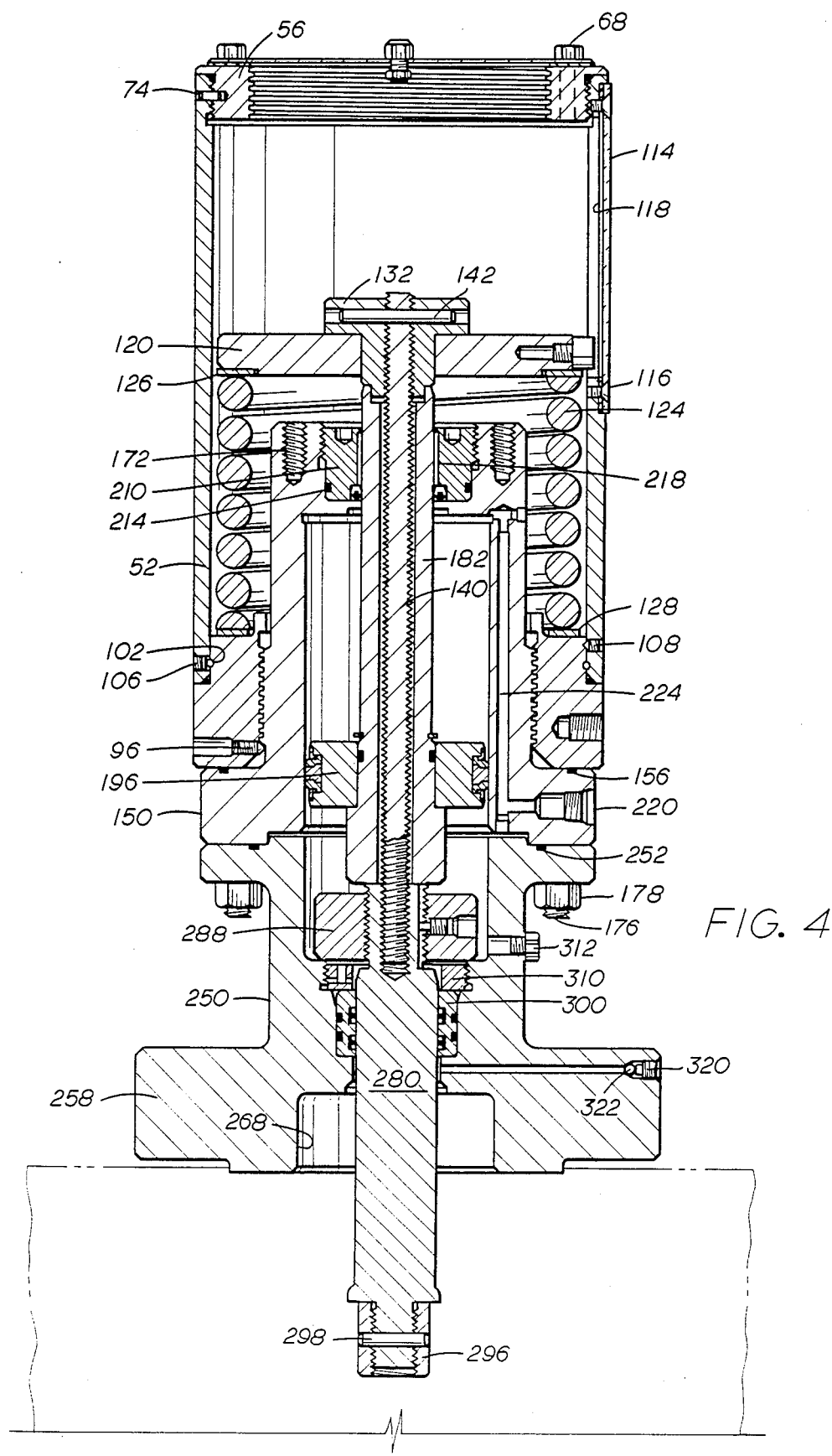
FIG. 4 is a vertical cross-sectional view of the actuator shown in FIGS. 1, 2, and 3, with the gate-actuating parts in their lower positions, corresponding to the valve's being open.

Referring initially to FIGS. 1-4, there is disclosed the standard or non-wirecutting embodiment of the surface safety valve hydraulic actuator of the present invention, indicated generally at 10. Actuator 10 is mounted on the body of a valve 12 by a plurality of studs 14 and nuts 16. Valve body 12 has a pair of coaxial flow passages 18, 20 therethrough, intersected by a pair of gate segments 22, 24 having solid portions 26, 28 and ports 30, 32, respectively. When the gate segments are in their raised or upper positions, fluid flow through flow passages 18, 20 is blocked by solid gate segment portions 26, 28. When the gate segments are in their lowered positions, ports 30, 32 are in register with flow passages 18, 20 and fluid flow is permitted through the valve. Actuator 10 is connected to gate segments 22, 24 for reciprocating them with respect to the flow passages 18, 20 and regulating fluid flow through the valve, as hereinafter described.

Actuator 10 includes a spring module 50, a hydraulic cylinder 150, and a bonnet 250. Spring module 50 is removably attached to hydraulic cylinder 150 and can be removed therefrom and reattached, or replaced either with another standard or non-wirecutting spring module or with a wirecutting embodiment of the spring module of the present invention, all without disturbing the pressure integrity of the valve. In addition, the hydraulic cylinder 150 is removably attached to the bonnet 150 and can be removed therefrom and reattached or replaced, also without disturbing the pressure integrity of the valve. The spring module 50 and hydraulic cylinder 150 thus can be conveniently separated from the bonnet 250 without actuator strip-down and without production shutdown.

Spring module 50 includes a generally circular cylindrical hollow or tubular spring can 52, threaded around the inner periphery of its upper end at 54. A circular cylindrical, annular end plate 56 having threads 58 around its outer periphery is threadedly received in the upper end of spring can 52, threads 58 mating with threads 54. End plate 56 has a radially outwardly extending flange 60 around its upper outer periphery. The lower surface of flange 60 abuts the upper end surface 62 of spring can 52 when end plate 56 is fully threadedly received in the spring can. An o-ring seal 64 is disposed in an annular groove around the radially inner portion of the upper end 62 of spring can 52 and provides a fluid-tight seal against the lower surface of flange 60. A solid circular end cover 66 is disposed on top of end plate 56 and is retained thereon by a plurality of hex head screws 68 threadedly received in longitudinally axially extending bores 70. An annular end cover gasket 72 is disposed between the flat lower surface of end cover 66 and the flat upper end surface of end plate 56, and provides a fluid tight seal between the end cover and end plate. A dowel pin 74 is disposed in a radially extending bore 75 through the wall of the spring can 52 and in a coaxial, radially extending blind bore 76 in end plate 56 to prevent the end plate from rotating with respect to the spring can.

Spring can 52 is rotatably connected at its lower end to an annular spring retainer 78. Spring retainer 78 is a generally tubular cylindrical member having a lower portion 80 with outer diametral surface 82; an intermedite, reduced outer diameter portion 84 above lower portion 80 with an annular shoulder 86 therebetween, and outer diametral surface 88; and an upper, further reduced outer diameter portion or upstanding boss 90 above reduced outer diameter portion 84 with an annular shoulder 92 therebetween. Spring retainer 78 is threaded around its inner periphery, as at 94, and is mounted on the hydraulic cylinder 150, being threadedly engaged with mating threads 152 disposed around the outer periphery of body 154 of hydraulic cylinder 150. Threads 94, 152 may be, for example, Acme threads. A full dog set screw 96 disposed in a radially extending bore 98 in spring retainer 78 engages the exterior surface of body 154 of hydraulic cylinder 150 and prevents relative rotation between spring retainer 78 and hydraulic cylinder body 154. An o-ring seal 156 is disposed in an annular groove in the upper surface 158 of a lower flange 160 of hydraulic cylinder body 154, and provides a fluid-tight seal against the flat lower face 100 of spring retainer 78. Lower face 100 of spring retainer 78 abuts upper surface 158 of lower flange 160 when the spring retainer is fully threadedly received on hydraulic cylinder body 154. A set of stainless steel ball bearings 102 is disposed in an annular ball race in the outer surface 88 of intermediate portion 84 of spring retainer 78, and in the inner surface around the lower end of spring can 52. Ball bearings 102 are inserted into their race through threaded port 104 in the wall of spring can 52, and are retained therein by a sealed screw plug 106. Ball bearings 102 permit the full 360° rotation of spring can 52 with respect to spring retainer 78 without axial separation therebetween. A plurality, e.g. three, of cone point set screws 108 disposed in threaded ports 110 in the wall of spring can 52, when engaged with the outer surface of intermediate portion 84 of spring retainer 78, prevent further rotation of spring can 52 with respect to spring retainer 78 when the desired rotational position of spring can 52 is obtained.

An elongate, longitudinally extending oval-shaped slot 112 is provided through the wall of spring can 52 beginning near its upper end. A clear plastic cover 114 retained in a recess 115 in the outer surface of spring can 52 over slot 112 by a pair of countersunk head screws 116 provides a window through which the positions of the internal parts of the spring module 50 can be observed visually and, hence, the positions of the gate segments opening or closing the valve positively determined. A gasket 118 disposed between cover 114 and the face of recess 115 in spring can 52 provides a fluid-tight seal for the window. Since the spring can 52 is rotatable through a full 360° with respect to the spring retainer 78, the rotational position of the window can be adjusted in order properly to provide the best available view therethrough.

A circular spring plate 120 having a central axial bore or aperture 122 therethrough is disposed inside spring can 52 below end plate 56. Spring plate 120 has an outer diameter which is less than the inside diameter of spring can 52, but greater than the inside diameter of end plate 56. Thus, spring plate 120 can move easily in a longitudinal axial direction with respect to spring can 52, but is retained within spring can 52 by end plate 56. A coil spring 124 is disposed in spring can 52 between the lower face of spring plate 120 and shoulder 92 of spring retainer 78. Upper and lower poly coated slip rings 126, 128 help reduce wear and galling between spring 124 and spring plate 120, and between spring 124 and spring retainer 78, respectively. Spring plate 120 is provided with a plurality, e.g. four, of longitudinally extending bores 130 (FIG. 2) therein, through which may be inserted threaded rods or the like for compressing spring 124 when spring module 50 is to be removed, as is described further below. Bores 130 are preferably located approximately equidistant from the central longitudinal axis of spring plate 120, and are approximately equally angularly spaced apart on the plate.

A spring coupler 132 having a lower body portion 134 and an upper flange portion 136 is disposed with its lower body portion 134 slidingly received in the bore 122 of spring plate 120 and the lower face of its upper flange portion 136 abutting the flat upper face 123 of spring plate 120. Spring coupler 132 has a central axial threaded bore 138 therein, which is coaxial with bore 122 of spring plate 120. A threaded coupling rod 140 is threadedly received within threaded bore 138 of spring coupler 132. A dowel pin 142 is received in a radially extending bore 144 in spring coupler 132 and in coupling rod 140 to prevent relative rotation between coupling rod 140 and spring coupler 132.

A sintered bronze relief vent 146 (FIG. 2) disposed in a radially extending threaded port 148 through the wall of spring can 52 allows venting of the spring can but keeps contamination out.

Hydraulic cylinder 150 includes a generally tubular, circular cylindrical body 154 having an outwardly extending flange portion 160 around its lower end. As previously described, body 154 has a threaded portion 152 around its outer periphery above flange 160 for matingly receiving threads 94 of spring retainer 78. Body 154 has a smooth interior bore 162 extending upwardly from its lower end to an annular shoulder 164, above which body 154 has a reduced inner diameter bore portion 166. Above reduced diameter bore portion 166, body 154 of hydraulic cylinder 150 has a counterbored pocket 168 having threads 170 around its upper inner periphery. A plurality, e.g. four, of blind threaded bores 172 extend longitudinally from the upper end 174 of body 154. Threaded bores 172 are coaxial with bores 162, 166, 168 and are spaced so as to be coaxial and in register with bores 130 in spring plate 120 when spring plate 120 is properly rotationally oriented. Bores 172 are adapted to receive the threaded rods, which may be inserted through bores 130 as referred to above, and which may be used to compress spring 124, as is described further below. Hydraulic cylinder 150 is mounted on bonnet 250 with a plurality of studs 176 and corresponding nuts 178. An o-ring 252 is disposed in an annular groove in the upper face of an upper flange portion 254 of bonnet 250, and provides a fluid-tight seal against the lower end face 180 of body 154.

An upper stem 182 of hydraulic cylinder 150 has an elongate tubular neck portion 184 and an enlarged outer diameter lower end portion 186, creating a shoulder 188 therebetween. Neck 184 of upper stem 182 extends from cylinder chamber 190 of hydraulic cylinder 150, out through reduced diameter bore portion 166 and counterbore 168 of body 154, and upwardly to the lower end of spring coupler 132. Upper stem 182 has a central axial bore 192 in which is housed coupling rod 140. Bore 192 has a larger diameter than the outer diameter of coupling rod 140. The upper end of neck 184 of upper stem 182 has a counterbore 194 therein for slidingly receiving a downwardly projecting annular portion 149 of spring coupler 132.

An annular piston 196 is disposed around the lower end of neck portion 184 of upper stem 182, and is retained against shoulder 188 by a snap ring or circlip 198. Piston 196 is sealed against upper stem 182 by a seal member 200 comprising, for example, an o-ring backed up by Teflon rings from above and below the o-ring. Piston 196 is free to rotate around upper stem 182. A Mercury seal 202, comprising a rubber ring 204 backed up from above and below by Teflon rings 206, 208, respectively, is carried around the exterior periphery of piston 196 and provides a sliding seal against the walls 162 of cylinder chamber 190.

An upper stem seal cartridge 210 is threadedly received in counterbore 168 in body 154 of hydraulic cylinder 150. Upper stem seal cartridge 210 includes an annular body 212 having a central axial bore through which upper stem 182 extends. Body 212 carries a seal member 214 in an annular groove in its outer periphery for providing a fluid-tight seal between bodies 212, 154. Seal member 214 may be, for example, an o-ring backed up from above by a Teflon ring. Seal cartridge body 212 also carries a seal member 216 in an annular groove around its inner periphery for providing a sliding seal with the exterior surface of upper stem 182. Seal member 216 may include, for example, a rubber seal member backed up from above by a Teflon ring. A wear bushing 218 is disposed in the upper stem seal cartridge around upper stem 182 to provide guidance for stem 182 and reduce wear and galling as the stem reciprocates through the stem seal into and out of hydraulic cylinder 150.

A hydraulic fluid supply port 220 extends radially inwardly from the outer surface of flange portion 160 and is in fluid communication with a first radially extending fluid passageway 222. Passageway 222 extends to and is in fluid communication with a longitudinally extending fluid passageway 224 in body 154. Passageway 224 extends to and is in fluid communication with a second radially extending fluid passageway 226, which in turn is in fluid communication with cylinder chamber 190 above piston 196. Thus, pressurized control fluid, which may be, for example, either water-based or pertroleum- (mineral) based hydraulic fluid, can be applied through port 220 and passageways 222, 224, and 226 to chamber 190, thereby forcing piston 196 downwardly in the chamber and opening the valve, as discussed further below. When control fluid at the requisite pressure is no longer applied to the chamber above piston 196, spring 124 operates to close the valve, again as discussed further below.

Bonnet 250 includes a generally tubular cylindrical body 256 having a radially outwardly extending upper flange portion 254, and a radially outwardly extending lower flange portion 258. Lower flange portion 258 is larger in outside diameter than upper flange portion 254, and greater in axial thickness, as well. Lower flange portion 258 is provided with a plurality of circumferentially spaced apart, longitudinally axially extending bores for receiving studs 16 therewithin for attaching bonnet 250 to valve body 12.

Body 256 has a central axial bore 260 therein. A frustoconical backseat surface 262 flares downwardly and outwardly from central bore 260, and extends to an enlarged bore portion 264 below backseat surface 262. Enlarged bore portion 264 has a larger inside diameter than central bore 260 and extends downwardly from backseat surface 262 to a lower counterbore 268, there being an annular shoulder 266 between counterbore 268 and bore portion 264. Avove central bore 260, body 256 has a first upper counterbore 270 with an inside diameter greater than central bore 260, there being an annular shoulder 272 between counterbore 270 and central bore 260. Above first upper counterbore 270, body 256 has a second upper counterbore 274 with an inside diameter greater than first upper counterbore 270. Second upper counterbore 274 has a threaded inner diametral surface 276. A third upper counterbore 278 is disposed above second upper counterbore 274 and has a greater inside diameter than counterbore 274. Third uper countnerbore 278 forms a part of cylinder chamber 190, along with bore 162 of hydraulic cylinder 150.

A lower stem 280 is reciprocatingly disposed in bores 260, 262, 264 and counterbores 268, 270, 274, and 278 and extends upwardly to adjoin the lower end 187 of upper stem 182. Lower stem 280 is a generally solid cylindrical member having an externally threaded, reduced outside diameter upper end portion 282 and an externally threaded, reduced outside diameter lower end portion 284. Upper end portion 282 has an internally threaded central blind bore 286 extending longitudinally axially downward from its upper terminal end 285. Central blind bore 286 is adapted for threadingly receiving the lower end of coupling rod 140 therewithin. The upper terminal end 285 of upper stem 280 abuts the lower terminal end 187 of upper stem 182. An annular drift adjuster 288 having a central axial threaded bore is threadingly mounted on upper end portion 282 of upper stem 280. A set screw 290 disposed in a radially extending threaded bore 292 in drift adjuster 288 engages an axially extending slot 294 in upper end portion 282 to prevent relative rotation between drift adjuster 288 and upper stem 280. Drift adjuster 288 provides a stop for downward travel of lower stem 280. The axial position of drift adjuster 288 on stem 280 can be adjusted slightly up or down by loosening set screw 290 and unscrewing drift adjuster 288 somewhat from, or screwing it further onto, threaded end 282 of stem 280 and then tightening set screw 290.

A lifting nut 296 is threadedly received on the lower externally threaded end portion 284 of stem 280 and is prevented from rotating with respect thereto by a dowel pin 298 disposed in a radially extending bore through lifting nut 296 and lower end portion 284. Lifting nut 296 is attached to gate segments 22, 24 and raises and lowers them when stem 280 is raised and lowered as described further below.

A lower stem seal cartridge 300 is disposed in first upper counterbore 270 and carries annular seal members 302, 304 in grooves in its outer diametral surface for sealing against the walls of counterbore 270. Seal cartridge 300 also carries annular seal members 306, 308 in grooves in its inner diametral surface for providing a sliding seal against the outer surface of lower stem 280. Seal members 302, 304 may include, for example, o-ring seals backed up by suitable rings of Teflon or the like. Seal members 306, 308 may also include, for example, a seal element and suitable backup rings. Seal cartridge 300 is held in place by a cartridge retainer ring 310 disposed around stem 280 and threadedly received in counterbore 274.

A sintered bronze relief vent 312 substantially the same as relief vent 146 is disposed in a radially extending threaded port 314 extending through the wall of body 256 and into counterbore 278 for allowing venting from chamber 190 but preventing contamination from entering the chamber. A check ball bleeder port 316 extends radially from bore 260 through lower flange portion 258 of body 256 to its exterior surface, and has an enlarged, internally threaded outer end portion 318 in which is threadedly disposed a bleeder screw 320. A check ball 322 is disposed radially inwardly of bleeder screw 320 in enlarged outer end portion 318 of bleeder ort 316. Bleeder port 316, check ball 322 and bleeder screw 320 are adapted for bleeding fluids from bore 260 without permitting entry of fluids from without the actuator 10.

Lower stem 280 includes a lower, enlarged, outwardly extending flange portio 324 having a frustoconical sealing surface 326 for matingly and sealingly engaging the backseat surface 262 of bonnet 250 in a metal-to-metal seal when stem 280 is in its uppermost position.

Figure 5:
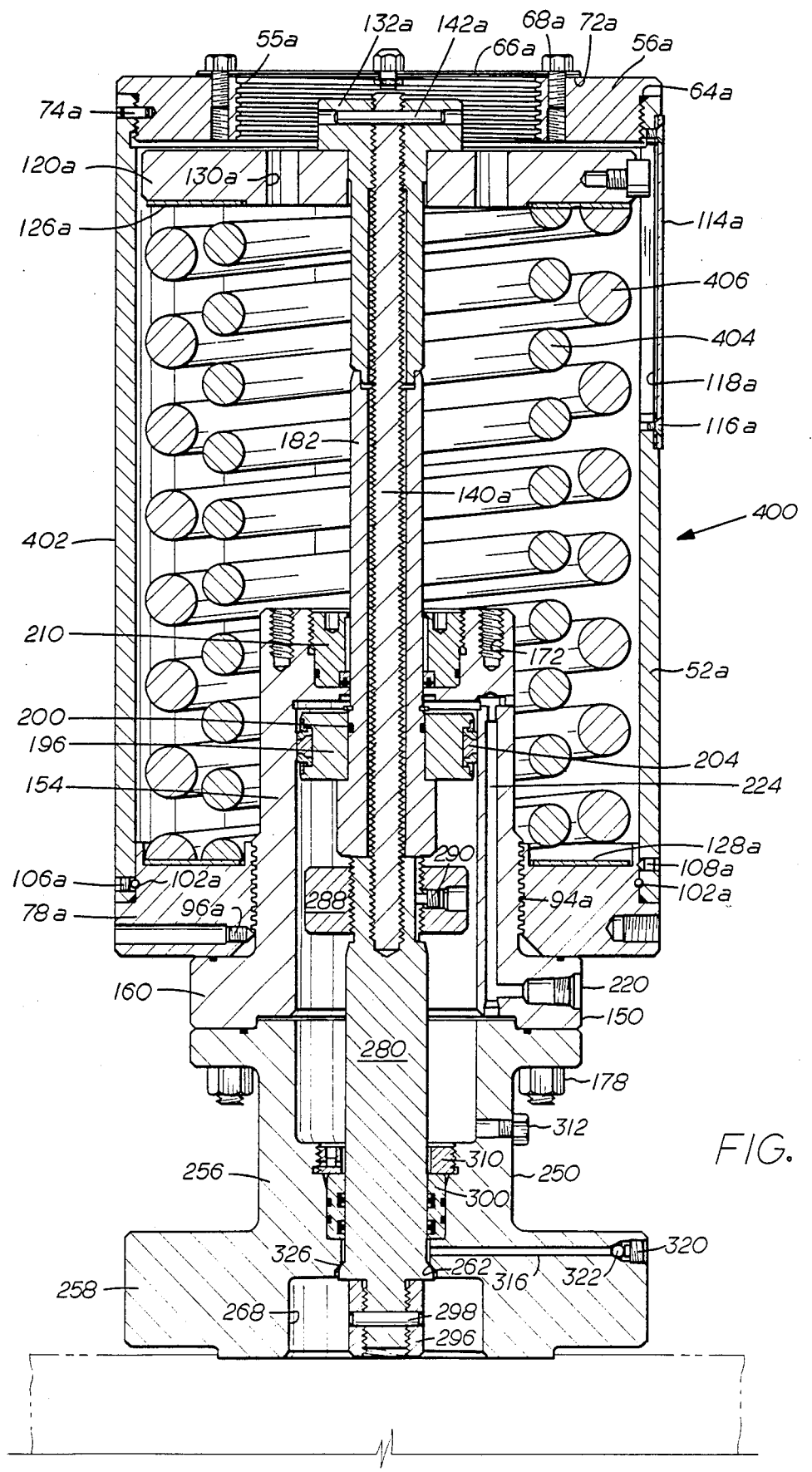
FIG. 5 is a vertical cross-sectional view of the wirecutting actuator of the present invention, with the gate-actuating parts in their upper positions, corresponding to the valve's being closed.
Figure 6:
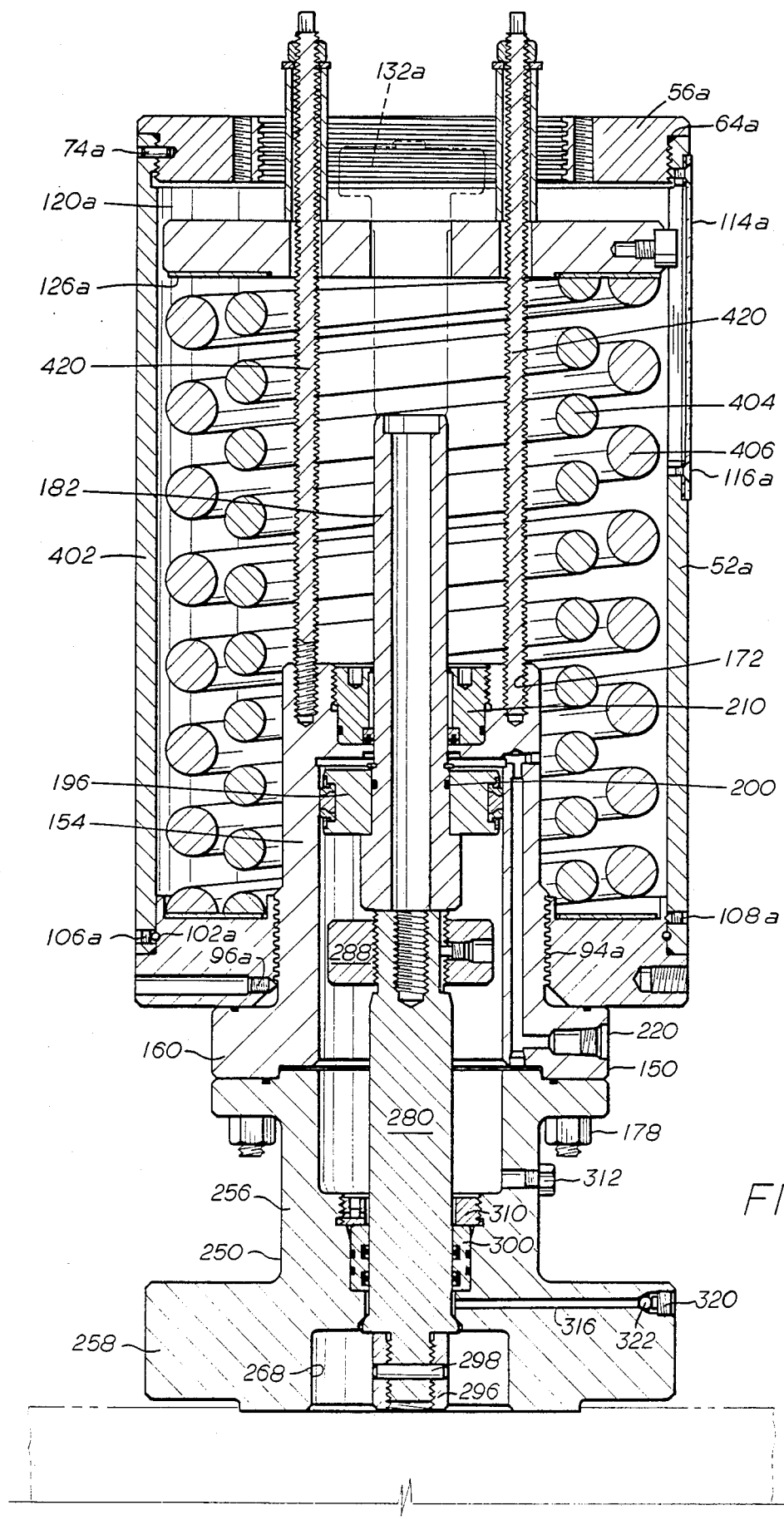
FIG. 6 is a vertical cross-sectional view of the actuator shown in FIG. 5, with threaded rods installed through the spring plate into the hydraulic cylinder to compress the dual coil springs, and the coupling rod and spring coupler having been removed.
Figure 7:
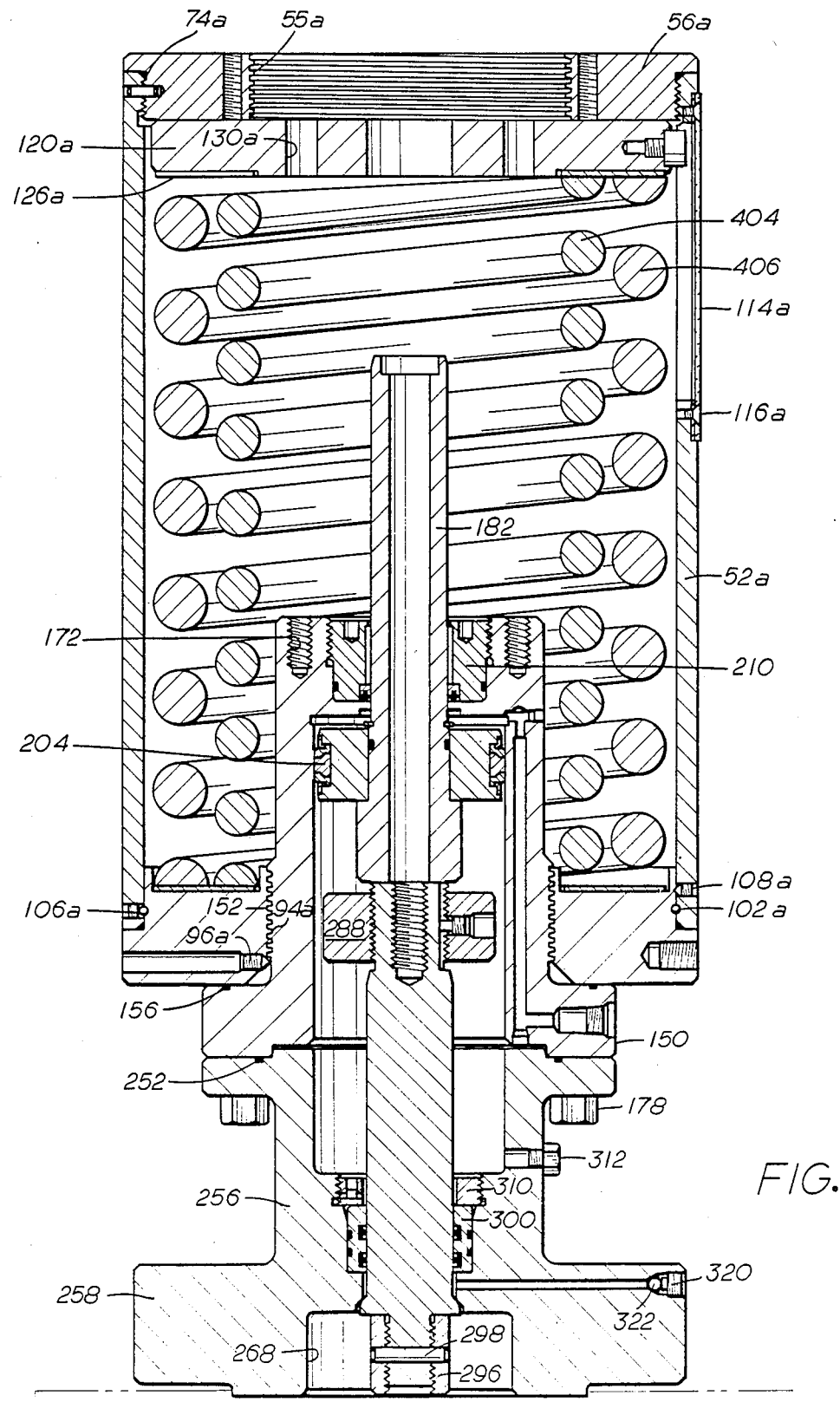
FIG. 7 is a vertical cross-sectional view of the actuator of FIG. 6, with the threaded rods removed and the spring module ready for removal from the hydraulic cylinder.

Referring now to FIGS. 5-7, there is disclosed the wirecutting embodiment of the surface safety valve hydraulic actuator of the present invention, indicated generally at 400. The wirecutting actuator 400 includes a spring module 402, a hydraulic cylinder 150, and a bonnet 250. Hydraulic cylinder 150 and bonnet 250 are indentical to those previously described with respect to the standard or non-wirecutting embodiment disclosed in FIGS. 1-4, and need not be further described. Spring module 402 is removably attached to hydraulic cylinder 150 and, like spring module 50 (FIGS. 1-4), can be removed therefrom and reattached, or replaced either with another wirecutting spring module or with a standard or non-wirecutting spring module of the present invention, all without disturbing the pressure integrity of the valve. In addition, like the combination of spring module 50 and hydraulic cylinder 150, spring module 402 and hydraulic cylinder 150 can be removed as a unit from bonnet 250 without actuator strip-down and without production shutdown.

Spring module 402 is substantially similar to spring module 50 except for the presence in spring module 402 of dual coil springs 404, 406 which together are more powerful than spring 124 of spring module 50, and the larger dimensions of many of the parts in spring module 402 than their counterparts in spring module 50 in order to accommodte the larger, dual coil springs. Parts of spring module 402 which otherwise correspond to substantially similar parts of spring module 50 are designated by their same reference numerals with the addition of a following letter "a." Since all of the parts so designated are substantially the same as their counterparts in spring module 50 (with the foregoing proviso), for the sake of brevity they will not be described further. Rather, reference should be had to the discussion of spring module 50, above, to ascertain the similar construction details of spring module 402. It should be noted that spring retainer 78a of spring module 402 is adapted to be threadedly mounted on hydraulic cylinder 150 in the same way as is spring retainer 78, and couopling rod 140a is adapted to be screwed into the upper end of lower stem 280 in the same way as is coupling rod 140. It should also be noted that while end plate 56a is larger in outer diameter than end plate 56, its internally threaded bore 55a, adapted for receiving a fire-safe lock-open cap or other auxiliary equipment (not shown), is substantially the same size as is bore 55 of end plate 56.

Inner coil spring 404 of spring module 402 is housed within an outer coil spring 406. Spring can 52a which houses both springs 404, 406 is larger in outside diameter than spring can 52, and relatively longer as well. Coupling rod 140a of spring module 402 is therefore longer than coupling rod 140 of spring module 50. Spring coupler 132a of module 402 also has a relatively longer lower body portion 134a than lower body portion 134 of spring coupler 132. Dual springs 404, 406 are powerful enough to shear up to a 7/32" braided wireline (⅛" single strand) without pressure assistance during operation of actuator 400, as is more fully described below.

The following list of part names and reference numerals indicates the materials of which the parts are preferably made. O-ring seals and similar annular seal members are preferably made of an elastomer such as nitrile rubber. Seal backup rings are preferably made of Teflon. Substantially all of the other parts not listed are preferably made of common steel of a type and grade typically used for offshore wellhead equipment. This list is not intended to be exhaustive of the materials which may be suitable for the indicated parts, but rather is illustrative only. Other materials, the selection of which is well within the capability of persons of ordinary skill in the art, may be used instead.

| Part Name | Reference No. | Material |
| --- | --- | --- |
| End Cover Gasket | 72, 72a | Neoprene |
| Spring Coupler | 132, 132a | Alloy Steel |
| Slip Rings | 126, 128; 126a, 128a | Coated Steel |
| Coil Springs | 124, 404, 406 | Alloy Steel |
| Window Gasket | 118, 118a | Neoprene |
| Window Cover | 114, 114a | Polycarbonate |
| Relief Vent | 146, 312 | Bronze/Steel |
| Ball Bearings | 102, 102a | Stainless Steel |
| Wear Bushing | 218 | Nylon |
| Cylinder Body | 154 | Alloy Steel |
| Studs | 176 | ASTM A-193 Gr. B7M |
| Snap Ring | 198 | Carbon Steel |
| Piston | 196 | Alloy Steel |
| Upper Stem | 182 | Alloy Steel, Hard Chromed |
| Drift Adjuster | 288 | Alloy Steel |
| Set Screw | 290 | Alloy Steel |
| Cartridge Retainer | 310 | Alloy Steel |
| Lower Stem | 280 | K Monel |
| Lifting Nut | 296 | Inconel |
| Dowel Pin | 298 | Silver Steel |
| Bonnet | 250 | Alloy Steel |
| Hex Nuts | 322 | ASTM A-194 Gr. 2 HM |
| Check Ball | 322 | Gr. 100 K-500 Monel |
| Bleeder Screw | 320 | Cadmium Plated |

In addition, again for illustrative purposes only and not for way of limitation, the following table provides some representative dimensions for the standard (STD) or non-wirecutting actuator and the wireline-cutting actuator (WLC) of the present invention, for some representative valve sizes:

| | Actuator Model | | | | | |
| --- | --- | --- | --- | --- | --- | --- |
| Dimensional Date | 3⅛" STD | 3⅛" WLC | 5⅛" STD | 5⅛" WLC | 6¾" STD | 6¾" WLC |
| Height, from top of valve body 12 | 19.75" 502 mm | 34.75" 883 mm | 29.75" 756 mm | 34.50" 876 mm | 33.75" 857 mm | 34.75" 883 mm |
| Diameter, excluding Bonnet | 8.75" 222 mm | 10.25" 260 mm | 11.25" 286 mm | 15.00" 381 mm | 12.25" 211 mm | 16.00" 407 mm |
| Weight, excluding Bonnet | 135 lbs 61 Kgs | 377 lbs 170 Kgs | 337 lbs 153 Kgs | 657 lbs 298 Kgs | 380 lbs 171 Kgs | 800 lbs 360 Kgs |

The surface safety valve hydraulic actuator of the present invention will typically be used in conjunction with gate valves of from 2" to 7" sizes, and of up to about 10,000 psi (700 Bar) working pressures. The hydraulic control pressure for the actuator of the present invention ranges from about 300 psi to a maximum of about 5,000 psi (345 Bar). The typical temperature range in which the present invention operates is from about −20° F. (−29° C.) to about 250° F. (121° C.).

In operation, the surface safety valve hydraulic actuator of the present invention is designed to close the valve on which it is mounted by spring force alone, without the assistance of body cavity pressure acting on the stem, upon loss of hydraulic control fluid to piston 196 in hydraulic cylinder 150. Hydraulic pressure with the requisite force is required in cylinder chamber 190 above piston 196 in order to keep the valve open against the coiled spring force. Thus, the valve is typically in a fail-safe-closed mode. Of course, by reversing the location of the solid portions 26, 28 and the ports 30, 32 in gate segments 22, 24, the valve can be operated in a fail-safe-open mode.

When pressurized hydraulic fluid is injected above piston 196 through port 220 and passageways 222, 224, 226, piston 196 is forced downwardly in chamber 190. Piston 196 drives upper stem 182 down with it, since the piston abuts against shoulder 188 of stem 182. Upper stem 182 in turn drives lower stem 280 downwardly as well, since lower end 187 of upper stem 182 abuts upper end 285 of lower stem 280. Lower stem 280 moves gate segments 22, 24 downwardly as well, and when drift adjuster 288 abuts the end wall of counterbore 278, downward travel of stem 280 stops, and ports 30, 32 of gate segments 22, 24 are in register with flow ports 18, 20 thereby opening the valve to fluid flow. As lower stem 280 moves downwardly, coupling rod 140, 140a moves downwardly as well, pulling with it spring coupler 132, 132a and spring plate 120, 120a, thereby compressing spring 124 and dual springs 404, 406, respectively, between the spring plate 120, 120a and the spring retainer 78, 78a, respectively. This configuration of the apparatus of the present invention is disclosed in FIG. 4, for the standard actuator.

When the pressurized hydraulic fluid is no longer applied above piston 196, the springs 124, 404, 406 expand upward rapidly, forcing the spring plate 120, 120a, the spring coupler 132, 132a, the coupling rod 140, 140a and, hence, the lower stem 280 and upper stem 182, upwardly as well. Lower stem 280 also carries lifting nut 296 upwardly, and with it, gate segments 22, 24, thereby closing the valve. When piston 196 is carried upwardly on lower stem 182, control fluid disposed in the chamber above the piston is returned via the passages 226, 224, 222, and 220 to its source. This configuration of the apparatus of the present invention is disclosed in FIGS. 2, 3, and 5.

Springs 124, 404, 406 are designed to close the valve upon loss of hydraulic control fluid, by spring force alone and without fluid pressure assistance from the valve body cavity. In addition, springs 404, 406 of spring module 402 are powerful enough to shear a braided wireline of up to 7/32" in diameter (⅛" single strand), which may be present in the flow passages of the valve during workover operations or the like, while effectively closing the valve.

Referring now to FIGS. 5–7, the procedures for removing spring module 402 from hydraulic cylinder 150, and for removing hydraulic cylinder 150 from bonnet 250, are substantially as follows. If it is desired to remove spring module 402 from hydraulic cylinder 150, hydraulic pressure is removed from above piston 196 and the valve is closed. Springs 404, 406 are in their expanded positions, and the sealing surface 326 of lower stem 280 is seated against backseat surface 262 of bonnet body 256. This configuration is illustrated, e.g., in FIG. 5. Nuts 68a, end cover 66a and end cover gasket 72a are removed, and a plurality of threaded rods 420 (FIG. 6) are inserted through apertures 130a in spring plate 120a and threaded into the blind bores 172 in the body 154 of hydraulic cylinder 150. Spring plate 120a is thus forced downwardly in spring can 52a, compressing springs 404, 406 slightly and removing the spring load from spring coupler 132a. Spring coupler 132a and coupling rod 140a are then unscrewed as a unit from lower stem 280 and removed from stems 280, 182. Refer to FIG. 6, wherein spring coupler 132a is shown in phantom line as having been removed along with coupling rod 140a (not shown). Rods 420 are removed, easing the springs 404, 406 into expansion until the spring plate 120a abuts the underside of end plate 56a (FIG. 7). Full dog set screw 96a is then loosened, and the entire spring module 402 can then be unscrewed at 94a, 152 and removed from hydraulic cylinder 150. In order to reinstall spring module 402 on hydraulic cylinder 150, spring module 402 is screwed onto threads 152 of hydraulic cylinder 150 and full dog set screw 96a is tightened. Threaded rods 420 are inserted through apertures 130a in spring plate 120a and threaded into body 154 of hydraulic cylinder 150 to compress springs 404, 406 somewhat. Coupling rod 140a, with spring coupler 132a attached, is then inserted through the central aperture in spring plate 120a and through upper stem 182, and is screwed into the upper end of lower stem 280. Threaded rods 420 are then removed, easing springs 404, 406 and spring plate 120a upwardly against spring coupler 132a. End cover gasket 72a, end cover 66a and retaining nuts 68 are then installed on top of end plate 56a.

The procedure for removing and installing a standard or non-wirecutting actuator are substantially the same as for the wirecutting version, exept that it might not be necessary to use threaded rods to compress spring 124 in order to install or remove spring coupler 132 and coupling rod 140. In the event that threaded rods are not necessary, spring coupler 132 is simply rotated against spring plate 120 in order to connect or disconnect coupling rod 140 to or from lower stem 280, as the case may be, all against the lesser force of spring 124 as compared to that of springs 404, 406.

When spring module 402 has been removed from hydraulic cylinder 150, it can be reinstalled or replaced with either another wirecutting spring module, or a standard or non-wirecutting spring module 50. Similarly, when a standard or non-wirecutting spring module 50 has been removed from hydraulic cylinder 150, it can be reinstalled or replaced with either another standard spring module, or a wirecutting spring module. Thus, spring modules 50, 402 are interchangeable with one another. It will be appreciated that the spring modules 50, 402 are removable, reinstallable, and interchangeable without disturbing the pressure integrity or drift setting of the valve.

Hydraulic cylinder 150 is easily removable from bonnet 250 and reinstallable thereon, also without disturbing the pressure integrity or drift setting of the valve. If the spring module 50 or 402 has been removed already, studs 176 and nuts 178 are removed and the hydraulic cylinder 150 can then simply be lifted from bonnet 250. With the lower stem backseated at 262, 326, the lower stem seal cartridge 300 can be removed and serviced or replaced, if necessary. If the spring module 50 or 402 has not been removed, then it will be necessary first to remove the spring coupler 132, 132a and the coupling rod 140, 140a as previously described in order to remove the spring module and hydraulic cylinder together, as a unit.

Figure 9:
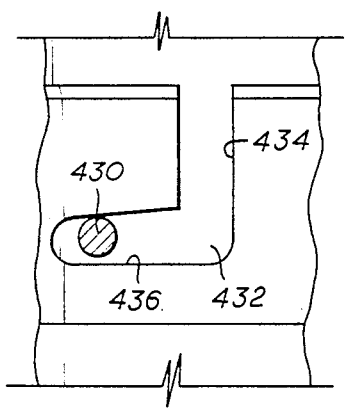
FIG. 9 is a schematic illustration of one alternative means of releasably connecting the spring module to the hydraulic cylinder of the present invention.

As an alternative to connecting the spring module 50, 402 to the hydraulic cylinder 150 with a threaded connection 94, 152 and 94a, 152, respectively, quick-connect and -disconnect means may be provided on the spring modules and the hydraulic cylinder for rapid connection of the spring module to, and its rapid disconnection from, the hydraulic cylinder. For example, as shown in FIG. 9, one of the spring modules 50, 402 and hydraulic cylinder 150 can be provided with a pressed-in pin 430, and the other of the spring modules and hydraulic cylinder can be provided with an L-shaped slot 432 in which pin 430 rides. Spring module 50, 402 can then be quickly attached to hydraulic cylinder 150 by inserting the spring module onto the cylinder so that the pin 430 enters the vertical leg 434 of slot 432, and then rotating the spring module so that the pin enters the horizontal leg 436 of slot 432. Full dog set screw 96, 96a is then tightened against hydraulic cylinder 150 to prevent the spring module 50, 402 from backing out of its connection. If pin 430 is disposed on body 154 of hydraulic cylinder 150, then it will be projecting radially outwardly, and the L-shaped slot will be disposed in the inside diametral surface of spring retainer 78, 78a and will be inverted from the position illustrated in FIG. 9. If pin 430 is disposed on spring module 50, 402, then it will be projecting radially inwardly from the inside diametral surface of spring retainer 78, 78a, and the L-shaped slot will be disposed on the outside surface of cylinder 150. A plurality of circumferentially spaced apart pins 430 and slots 432 may be used. It should be understood that other quick-connect and -disconnect means may be suitable for use with spring modules 50, 402 and hydraulic cylinder 150, and their selection and use is well within the capability of those of ordinary skill in the art.

Figure 8:
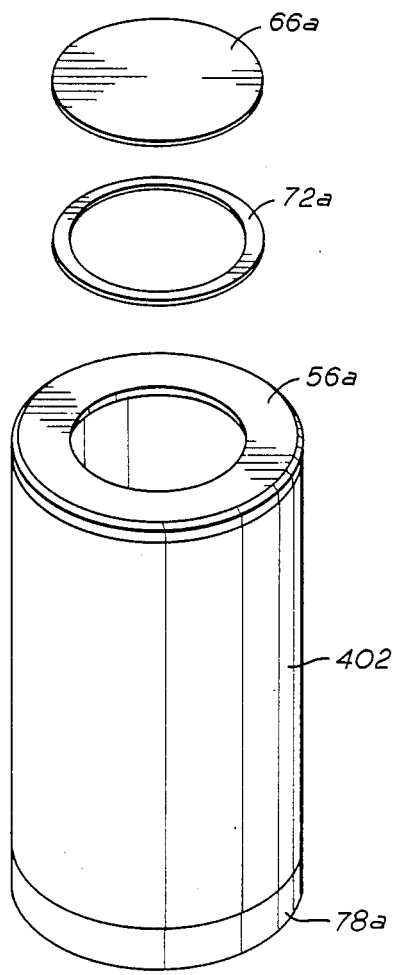
FIG. 8 is a schematic isometric view of the wirecutting spring module removed from the hydraulic cylinder and bonnet of the present invention.
Figure 8:
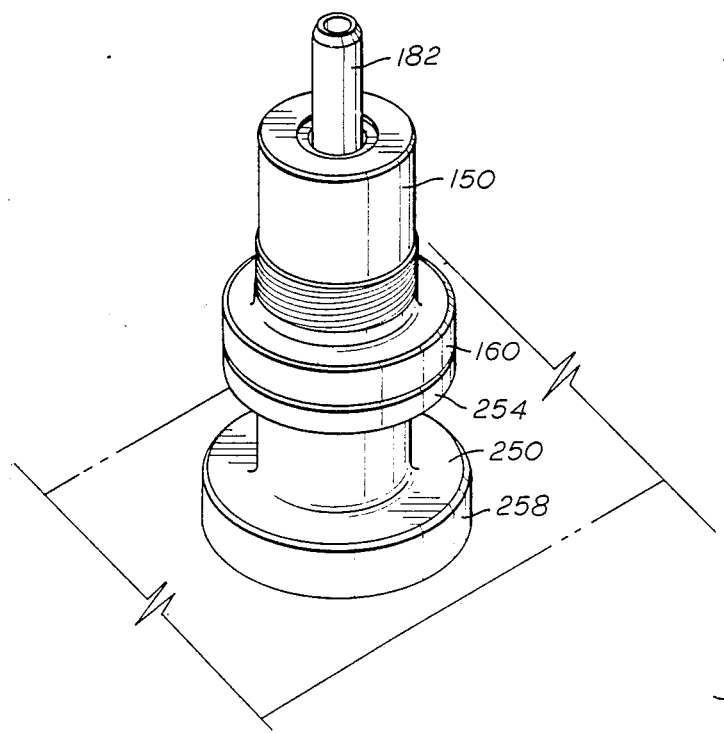

Referring to FIG. 8, there is disclosed in schematic form the spring module 402 removed from hydraulic cylinder 150, with end cover 66a and end cover gasket 72a removed from spring module 402, as well. Hydraulic cylinder 150 is shown as still attached to bonnet 250, but may be removed therefrom in accordance withthe procedure described above. The spring modules of the present invention assure safety for personnel during handling, since the springs 124 and 404, 406 are safely retained in spring cans 52, 52a by spring retainers 78, 78a and end plates 56, 56a, respectively. The low overall height and weight of spring modules 50, 402, the hydraulic cylinder 150, and the bonnet 250, and their small removal distance requirements, permit the actuators 10, 400 to fit tight platform spaces and provide for easier handling.

The wirecutting actuator of the present invention is particularly advantageously employed on a surface safety valve, usually an upper-master valve of a production Christmas tree, during periods such as, for example, when workover operations are performed or when the well is performing poorly, when the actuator not only must close the valve upon failure of hydraulic control pressure, but also must shear up to a 7/32" braided wireline which may be extending through the valve at the time, since during an emergency there might not be sufficient time to remove the wireline from the valve. During periods when wirecutting capabilities are not required, the spring module 402 on the upper-master valve, for example, can be replaced with the less expensive standard or non-wirecutting spring module 50. Thus, only one wirecutting spring module 402 need be on hand per given valve size, and it may be used as a "tool" and replaced with the non-wirecutting spring module 50 after the workover is complete. It should be understood that the wirecutting actuator 400 may also be used on wing valves of Christmas trees, or other types of valves. The standard or non-wirecutting actuator 10 may be employed to close a surface safety valve during normal production operations. Typical applications for the standard actuator 10 include Christmas tree wing valves, and valves for flowline lines/headers and pipelines. In particular, the actuators of the present application may be used advantageously with Sii McEvoy-Willis Model "C" reverse-acting gate valves.

Because many varying and different embodiments may be made within the scope of the inventor's concept taught herein, and because many modifications may be made in the embodiments herein detailed, it should be understood that the details set forth herein are to be interpreted as illustrative an not in a limiting sense. Thus, it should be understood that the invention is not restricted to the illustrated and described embodiments, but can be modified within the scope of the following claims.

I claim:

1. An actuator for a gate valve, the gate valve having a body with a flow passage therethrough and a cavity in the body, there being a gate disposed in the body cavity and reciprocable across the flow passage for alternately permitting and preventing the flow of fluids through the flow passage, comprising:

a bonnet having means disposed thereon for removably mountind the bonnet on the valve body, and lower stem means reciprocatingly disposed in the bonnet and having a lower portion adapted for extending into the valve body cavity and connecting to the gate and an upper portion extending out of the bonnet;

a hydraulic cylinder having a body and means disposed on said cylinder body for removably mounting said hydraulic cylinder on said bonnet, said hydraulic cylinder including upper stem means reciprocatingly disposed in said cylinder body and engaging said lower stem means, and means for supplying pressurized hydraulic fluid to said upper stem means for moving it downwardly in said cylinder, said lower stem means being moved downwardly along with said upper stem means; and a spring module including a body having means disposed thereon for removably mounting said spring module around said hydraulic cylinder, spring means disposed in said spring module body, and removable means connected between said spring means and said lower stem means for compressing said spring means when said lower stem means is moved downwardly and for lifting said lower stem means upwardly when said pressurized hydraulic fluid is removed from said upper stem means and said spring means is allowed to expand said spring module body having upper and lower retaining means disposed at its upper and lower ends, respectively, for retaining said spring means in said spring module body and for enabling removal of said spring module body and said spring means as a unit from said hydraulic cylinder when said removable means connected between said spring means and said lower stem means has been removed, whether said gate valve is open or closed and leaving said hydraulic cylinder in tact on said bonnet.

2. An acutator according to claim 1, wherein said lower stem means includes a lower stem member, said hydraulic cylinder includes a chamber therewithin, and said upper stem means includes an upper stem member having a lower end portion disposed in said chamber and carrying a piston mounted thereon and an upper neck portion extending out of said cylinder body, said lower end portion of said upper stem member engaging the upper portion of said lower stem member, said pressurized hydraulic fluid being supplied to said chamber above said piston.

3. An actuator according to claim 2, wherein said lower stem member is sealed with respect to said bonnet and said upper stem member is sealed with respect to said hydraulic cylinder.

4. An actuator according to claim 2, wherein said removable means connected between said spring means and said lower stem means extends from said spring means through said upper stem member to said lower stem member.

5. An actuator according to claim 2, wherein said spring means includes a coil spring, said upper stem member has an axial bore therethrough, and said removable means connected between said spring means and said lower stem means includes a spring plate disposed on the upper end of said coil spring and having a central aperture therein, a spring coupler slidingly received in the aperture of and bearing against said spring plate, and a coupling rod disposed in the axial bore of said upper stem member and having its upper end threadedly received in said spring coupler and its lower end threadedly received in the upper end of said lower stem member.

6. An actuator according to clami 5, and including anti-rotation means disposed between said upper end of said coupling rod and said spring coupler.

7. An actuator according to claim 6, wherein said anti-rotation means includes a dowel pin disposed in a transversely extending bore in said coupling rod and said spring coupler.

8. An actuator according to clam 1, wherein said spring module body includes a tubular main body portion of a generally circular cylindrical configuration, and said lower retaining means includes an annular spring retainer rotatably mounted on the lower end of said tubular main body portion.

9. An actuator according to claim 8, wherein said lower end of said tubular main body portion is telescoped over said annular spring retainer, and a set of ball bearings is disposed in a race around the interior periphery of said tubular main body portion and the exterior periphery of said annular spring retainer.

10. An actuator according to claim 8, and including releasable antirotation means disposed between said tubular main body portion and said annular spring retainer for preventing, when engaged, the rotation of said tubular main body portion with respect to said annular spring retainer.

11. An actuator according to claim 8, wherein said annular spring retainer includes mounting means on its inner diametral surface engageable with correlative mounting means on the exterior surface of said hydraulic cylinder for releasably mounting said spring module on said hydraulic cylinder.

12. An actuator according to claim 11, wherein said mounting means on said inner diametral surface of said spring retainer includes first screw threads, and said correlative mounting means on said exterior surface of said hydraulic cylinder includes second screw threads matingly engageable with said first screw threads.

13. An actuator according to claim 12, and including releasable antirotation means disposed between said spring retainer and said hydraulic cylinder for preventing, when engaged, the rotation of said spring retainer with respect to said hydraulic cylinder.

14. An actuator according to claim 11, wherein said mounting means on said inner diametral suface of said spring retainer and said correlative mounting means on the exterior surface of said hydraulic cylinder includes a radially projecting pin disposed on one of said spring retainer and said hydraulic cylinder and a substantially L-shaped slot disposed on the other of said spring retainer and said hydraulic cylinder for receiving said pin therewithin.

15. An actuator according to claim 14, and including releasable antirotation means disposed between said spring retainer and said hydraulic cylinder for preventing, when engaged, the rotation of said spring retainer with respect to said hydraulic cylinder.

16. An actuator according to claim 8, wherein said main body portion of said spring module body includes a slotted window therein for permitting visual observation of the interior of said spring module body from the exterior thereof.

17. An actuator according to claim 8, wherein said main body portion of said spring module body includes a relief vent therein for permitting venting therethrough from the interior of said spring module body to the exterior thereof but preventing contamination from entering therethrough from the exterior of said spring module body to the interior thereof.

18. An actuator according to clam 8, wherein said annular spring retainer partially closes said lower end of said spring module body, and said upper retaining mean includes an annular end plate mounted on the upper end of said main body portion and partially closing said upper end.

19. An actuator according to claim 1, wherein said spring means includes a pair of coil springs coaxially concentrically disposed in said spring module body for providing the actuator with wireline-cutting spring force.

20. An actuator according to claim 2, wherein said bonnet includes an upper counterbore comprising an extension of said chamber in said cylinder.

21. An actuator according to claim 20, wherein said lower stem member includes a drift adjustment member mounted thereon and engageable with the bottom of said upper counterbore for providing a stop for downward travel of said lower stem member.

22. An actuator according to claim 21, wherein said drift adjustment member is releasably axially movable on said lower stem member.

23. An actuator according to claim 20, and including a relief vent disposed in a bore through said bonnet body from said upper counterbore to the exterior of said body.

* * * * *